Jan. 5, 1960 D. T. HILL 2,919,498
MEANS FOR THE TEACHING OF BASIC ARITHMETIC NUMBER FACTS
Filed April 17, 1958
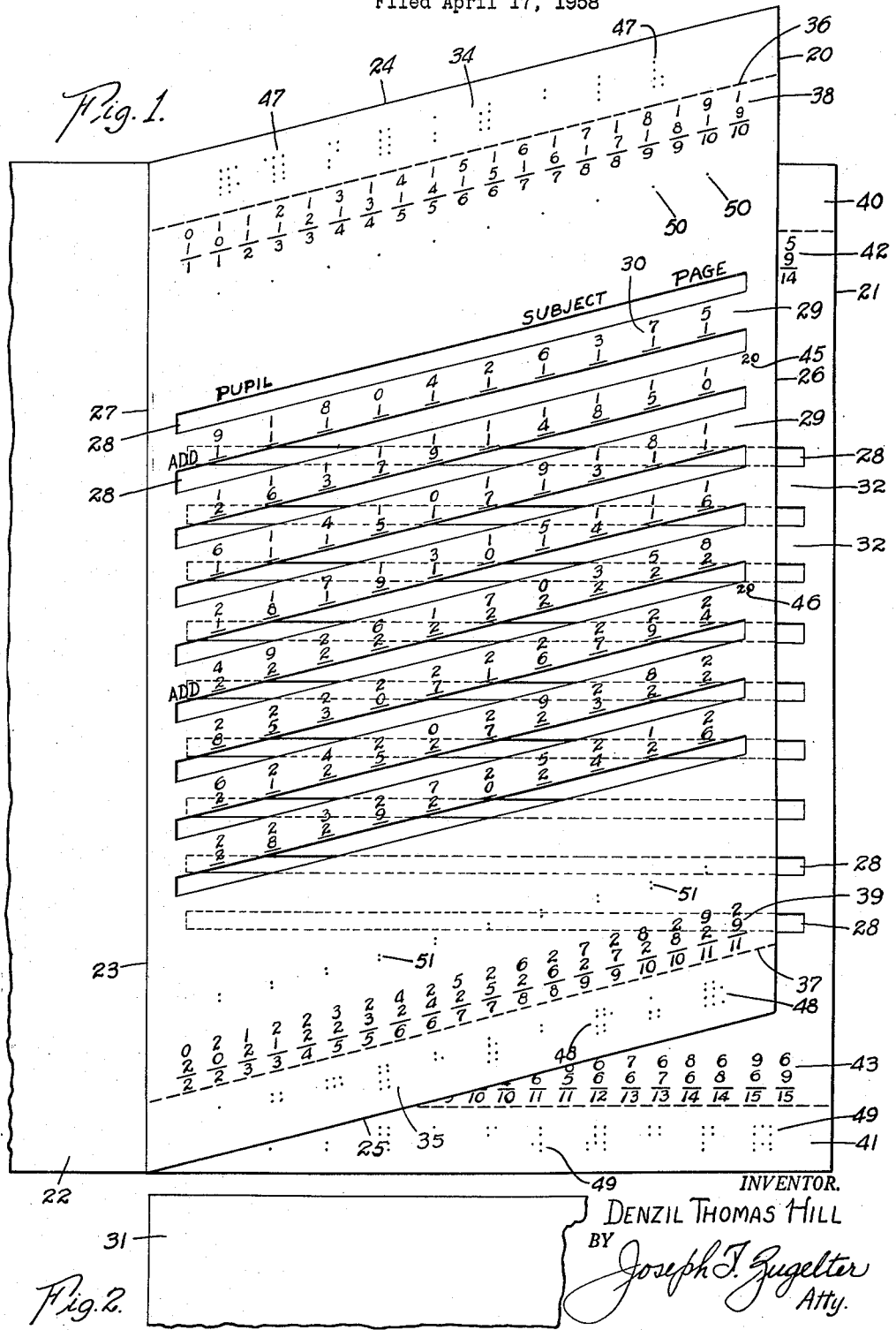

United States Patent Office

2,919,498
Patented Jan. 5, 1960

2,919,498

MEANS FOR THE TEACHING OF BASIC ARITHMETIC NUMBER FACTS

Denzil Thomas Hill, Cincinnati, Ohio

Application April 17, 1958, Serial No. 729,111

2 Claims. (Cl. 35—31)

The present invention relates to an improved method and means for the teaching of basic arithmetic, or the proper use of numbers, and is directed particularly to the objective of developing skill and knowledge essential to mastery of all the fundamentals pertaining to the use of numbers.

An object of the invention is to provide a method and means having unusual appeal to young students, whereby the use of numbers is taught with ease and dispatch, and in such manner as to be retained in the mind of the young student without laborious conscious effort on his part.

Another object is to provide simple and inexpensive physical means attractive to the young student, for achieving the above mentioned objectives.

A further object is to provide means in connection with a system of instruction, whereby checking and grading of the student's work sheets by his instructor is advantageously facilitated and expedited, and alternatively, the work sheets may be self-graded if desired, with the use of conveniently located tables or braces of problem answers normally to be concealed during the work period.

Another object is to provide physical means useful in connection with the aforesaid teaching method, which means may be used repeatedly and indefinitely with minimum expense to the student or the teaching institution.

The foregoing and other objects are attained by the means described herein and illustrated upon the accompany drawing, in which:

Fig. 1 is a fragmentary plan view of a device embodying the present invention, showing a page thereof partly turned.

Fig. 2 is a fragmentary plan view of a work sheet to be used in practicing the method of the instant invention.

In the drawing, the reference character 20 indicates one of a plurality of pages constituting a booklet, the front cover thereof being indicated at 22. A page adjacent to page 20 is indicated at 21, and it should be understood that a plurality of other pages similar to 20 and 21 underlie the pages 20 and 21. All of the pages may be bound in any suitable manner to the cover 22 and to a similar rear cover, not shown, so that the pages may be turned about the binding line 23 of the booklet. The binding may be performed in any acceptable known manner, such as by means of staples, rings, a spiral wire or plastic backbone, or the equivalent. A binding which permits flatwise disposition of the pages one upon another, is suggested as preferable in the present instance. As will become manifest later, binding of the pages may be dispensed with altogether if desired.

Each page constituting the booklet has an upper and a lower end 24 and 25, respectively, and opposed side edges 26 and 27. Intermediate the side edges, at approximate right angles thereto, each sheet is punched or slotted to provide a plurality of elongate windows 28 equally spaced apart by preference, the ends of the windows terminating near the opposite side edges of the sheet. Between adjacent windows is a printed area 29 to which is applied various groups of numerals 30 preferably underlined as shown. Such groups of numerals are subject to addition, subtraction, multiplication, or division, by the student user of the booklet. The answer to each problem represented by a group of numerals 30, is to be written by the student upon a work sheet 31 which may be interposed between two sheets such as 20 and 21, to present a writing area within the confines of each window 28. That is to say, the student applies a writing implement to the work sheet, through a window which is directly beneath a selected problem on page 20, for example, and write the answer upon that portion of the work sheet which is exposed through the window beneath the problem selected.

From the foregoing, it will be understood that the system results in the production of identical work sheets completed by any number of students, and that such work sheets will have their problem answers arranged in a definite specified order, to facilitate examination and grading by the instructor. The work sheets 31 may be plain paper sheets of a width corresponding to the width of a page 20. The length of a work sheet may approximate the length of a page 20, or if desired, it may be somewhat shorter. The head of each work sheet may bear the name of the student, the subject and page of the problems, or such other data as may be pertinent, applied by the student writing upon the work sheet through the uppermost window 28.

It may here be noted that the underlying page 21 of the booklet is substantially the same as page 20, with the exception that it carries different problems printed upon the problem-bearing area 32, and further, the areas 32 are offset in the direction of the page length so as to dispose said areas 32 in underlying relationship to the windows 28 of the other page 20. By reason of this staggered disposition of windows and solid areas of adjacent pages, the underlying solid areas 32 perform as backing panels for the work sheets, presenting smooth and firm writing surfaces and avoiding likelihood of puncture of work sheets by the writing implement. In the preferred form of the booklet, alternate pages are structurally like page 20, and those between are like page 21, to provide the desired staggered relationship of the windows 28 and solid areas 32, on all pages constituting the booklet.

The solid problem-bearing areas 29 and 32 of the booklet pages are seen to be wider than the height of the windows separating them. Preferably, the solid areas are about twice as wide as the window height, but may be greater in width if desired. By reason of this arrangement, a student completing all the problems on a page such as 20 by writing upon the work sheet through the several windows 28, may repeat the exercise by simply shifting the work sheet toward one end or the other of page 20, by an amount equal to the approximate height of a window, thereby to conceal the answers previously written and present clean areas of the work sheet at the windows for again writing the answers upon the work sheet immediately beneath the first set of answers. The number of times the work sheet may be so shifted depends upon the relative upright dimensions of the windows and intervening spaces, and the size of the numerals written by the student in applying the answers to the work sheet.

Referring to page 20 indicated upon the drawing, it may be noted that the upper and lower marginal portions of the page are separated from the intermediate portion of the page by means of parallel score lines 36 and 37, to provide flaps 34 and 35 that may be turned upon a surface of the page to cover horizontal braces of numerals 38 and 39 which constitute correct printed answers to the various problems applied to the spaces between the windows. While the student is solving the problems carried by the areas 29, he will preferably have the flaps 34 and 35 turned upon the printed matter at 38 and 39, thereby to conceal the problem answers. If the student is to grade his own work, he may be permitted to uncover the answers beneath the flaps, at a proper time.

The flaps 34 and 35 may be turned upon the rear of page 20, as well as upon the front of the page, because the rear of page 20 is to be printed like the front thereof to present problems involving numbers, and the answers thereto arranged as on the front of the page. In like manner, page 21 is printed on both faces, and provided with concealment flaps 40 and 41 to cover braces of answers such as those indicated at 42 and 43. The same applies to any additional pages of problems constituting the booklet.

If desired, numerals or indicia such as those applied at 45 and 46 may be associated with the various groups of problems, to indicate time periods in seconds, within which the student should complete the work of answering the problems presented.

The method of teaching as herein disclosed has proven highly successful in actual practice. It appeals to the young student in particular, and tests have shown an unusual retention of the knowledge and skill acquired by use of the system. Students taught under the present system rapidly acquire speed and skill in the use of numbers, without effort and fatigue, so that no barrier to further learning and advancement is developed in the student mind.

Some students find it helpful in learning to use numbers, if they can count objects or markings corresponding to the numbers with which they are concerned. To satisfy the requirements of such students, the flaps 34 and 35, 40 and 41, and other similar flaps, may be provided with markings or dots in groups, for example as shown at 47, 48, and 49, to be associated with other dots or markings such as 50 and 51 printed on the body of the pages. The rear faces of the several flaps will carry markings or dots like 47 and 48, so that these may by folding of the flap be brought into proximity with the rows of dots 50 or 51, making it easy for the student to count the dots so grouped, in arriving at a proper answer in addition or subtraction, the folding and unfolding of the flaps being of notable assistance in this regard. It should be noted that the rows of dots or marks 50 and 51 will not be covered by any flap folded onto the page.

The booklet designed and arranged as herein disclosed may be fabricated principally from paper stock at little expense, and may be used repeatedly for extended periods of time, so that no financial burden is imposed incident to introduction and use of the system. In conclusion, it is to be understood that various modifications and changes may be made in the structural details of the device, within the scope of the appended claims, without departing from the spirit of the invention.

What I claim is:

1. A device adapted for developing skill and speed in the use of numbers, said device comprising at least one problem page having upper and lower marginal portions scored to provide hinged flaps disposable flatwise upon the page, and opposite side edges defining the width of the page, said page being slotted in the direction of the flap scores at intervals intermediate the upper and lower marginal portions to provide a series of elongate parallel windows extending substantially at right angles to the side edges of the page, and problem-bearing areas intermediate successive windows, a brace of problem answers applied to the page adjacent to each of the flaps aforesaid, said problem-answers being so located as to be covered by said flaps upon turning of the flaps onto the page in flatwise parallelism thereto, and the windows being of such height as to present areas in which problem answers may be hand-written upon a work sheet underlying the windows of the problem page, said problem page having applied thereto a series of counting marks, and each flap having applied thereto groups of counting marks to be placed in juxtaposition to the counting marks of a page upon turning of the flaps in overlapping relationship upon the page, the counting marks of the page being spaced from the flap score line a distance in excess of the flap width, thereby to insure exposure of the counting marks of the page in all positions of the flaps.

2. A device adapted for developing skill and speed in the use of numbers, said device comprising at least one problem page having upper and lower marginal portions one of which portions is scored to provide a hinge flap disposable flatwise upon the page, and opposite side edges defining the width of the page, said page being slotted in the direction of extension of the flap score at intervals intermediate the upper and lower marginal portions to provide a series of elongate parallel windows extending substantially at right angles to the side edges of the page, and problem-bearing areas intermediate successive windows, a brace of problem answers applied to the page adjacent to the flap aforesaid, said problem answers being to located as to be covered by said flap upon turning of the flap onto the page in flatwise relation thereto, and the windows being of such height as to present areas in which problem answers may be hand-written upon a work sheet underlying the windows of the problem page, said problem page having applied thereto a series of counting marks, and the flap having applied thereto a group of counting marks to be placed in juxtaposition to the counting marks of the page upon turning of the flap onto the page in flatwise relationship, the counting marks of the page being spaced from the flap score line a distance in excess of the flap width, thereby to insure exposure of the counting marks of the page in all positions of the flap.

References Cited in the file of this patent

UNITED STATES PATENTS

| | | |
|---|---|---|
| 1,490,934 | McDade | Apr. 22, 1924 |
| 2,213,225 | Maggioni | Sept. 3, 1940 |
| 2,305,972 | Lorber | Dec. 22, 1942 |
| 2,879,608 | Watkins | Mar. 31, 1959 |